United States Patent Office

3,491,144
Patented Jan. 20, 1970

3,491,144
PRODUCTION OF AROMATIC TRICARBOXYLIC
ACIDS HAVING ONLY TWO VICINAL CAR-
BOXYLIC ACID GROUPS
George Ember, Palisades Park, N.J., and Donald E.
Hannemann, Griffith, John K. Darin, Whiting, and Wilford J. Zimmerschied, Crown Point, Ind., assignors to Standard Oil Company, Chicago, Ill., a corporation of Indiana
No Drawing. Filed Sept. 20, 1966, Ser. No. 580,617
Int. Cl. C07c 63/02
U.S. Cl. 260—524                                              4 Claims This invention relates to the production of aromatic tricarboxylic acid having only two vicinal carboxylic acid groups and more particularly pertains to an improved technique for catalytic liquid phase oxidation of trimethyl substituted aromatic hydrocarbons having only two methyl substituents on vicinal ring carbons with air to aromatic tricarboxylic acids having only two carboxylic acid group substituents on vicinal ring carbons and having the third carboxyl group as a substituent on a non-vicinal ring carbon.

The conversion of trimethyl substituted aromatic hydrocarbons by catalytic liquid phase oxidation with air in the presence of heavy metal oxidation catalysts and side chain oxidation initiators or promoters to aromatic tricarboxylic acids is disclosed and suggested by many prior patents. In general, the use of three different catalyst systems are proposed. All employ heavy metals of the class of those having atomic weight of from about 50 to about 200, desirably those in this class which are variable valence or transition metals, and show a preference for using cobalt alone or in combination with manganese. These oxidation metal catalysts are usually introduced in a form soluble in the hydrocarbon to be oxidized and/or an oxidation solvent medium such as the $C_2$ to $C_8$ monocarboxylic acids especially acetic acid, propionic acid, lower alkanoic acids and benzoic acid. The three different catalyst systems are provided by the use in combination with said heavy metals of one of the following promoters or initiators of side chain oxidation, acetaldehyde methyl ketones especially methyl ethyl ketone, and bromine. For the latter system any form of bromine supplying ionic bromine in the reaction system, i.e. ionic, elemental and combined bromine as in organic bromides can be used. The systems of catalysis employing heavy metal oxidation catalysts in combination with acetaldehyde or with methyl ketones was first disclosed in U.S. Patent 2,245,528 and the use of such systems of catalysis for oxidations of alkyl substituted aromatics with air at temperatures lower than disclosed as useful in U.S. Patent No. 2,245,528 have been taught as useful by others. The discovery of the unique system of catalysis provided by heavy metal oxidation catalysts and bromine for the rapid, high conversion of di-, tri- and other poly-substituted aromatics with molecular oxygen (e.g. air) in a liquid system on a once through basis is described in U.S. Patent No. 2,833,816. Later patents teach applications of said unique system of catalysis to various means for exploiting that oxidation method for the commercial production of the three isomeric phthalic acids singly or as mixed acid products and benzene tricarboxylic acids such as trimesic and trimellitic acid, among others.

In general the aforementioned catalytic liquid phase oxidations using air as a source of molecular oxygen are conducted at 50° to 275° C. and at a pressure to maintain a liquid phase of alkyl substituted aromatic hydrocarbons being oxidized and/or the oxidation solvent medium at the temperature of oxidation. Commercial developments utilizing the foregoing systems of catalysis employ controlled reaction temperature within a narrow range; staged reaction temperatures such as starting at a low or initiation temperature, increasing reaction temperature to obtain maximum oxidation rate and then lowering oxidation temperature for tail out oxidations or substantial completion of the oxidation to oxidize small amounts of partial oxidation co-products such as methylol benzoic acids, formyl benzoic acids, and the like. These oxidations have been taught as applied to batchwise, time staged intermittent batchwise, semi-continuous and continuous modes of operation.

It has been found that certain polymethyl substituted aromatics when oxidized with air in the foregoing catalytic liquid oxidation systems appear to produce oxidation co-products which provide undesired autoinhibition of oxidation. That is, there are formed partial oxidation products which prevent substantial completion of the oxidation of the polymethyl substituted aromatic hydrocarbon feeds to the desired aromatic polycarboxylic acids. This autoinhibition is most pronounced in the oxidation of aromatics having two methyl substituents on vicinal ring carbons, e.g. ortho-xylene, 1,2,4-trimethylbenzene (pseudocumene), durene and others. In the catalytic liquid phase air oxidation of pseudocumene the auto-inhibition has the effect of limiting trimellitic acid yields to the range of 65 to 75 mole percent. The effect of auto-inhibition appears to be to prevent the oxidation of methyl substituted phthalic acids to trimellitic acid and the oxidation of reducible partial oxidation products such as formyl phthalic acids and methylol phthalic acids to trimellitic acid. Trimellitic acid appears to have an auto-inhibiting effect on the oxidation of pseudocumene rather than an auto-oxidative effect. Some free radical mechanisms are believed to adversely effect the oxidation of methyl phthalic acids and the reducible partial oxidation products. The same or similar auto-inhibition occurs in the catalytic liquid phase oxidation of other trimethyl substituted aromatics having only two methyls on vicinal ring carbons.

It would appear that a higher thermal driving force, higher reaction temperature or a selected stage of use of higher reaction temperature would effectively result in higher trimellitic acid yields. However, reaction temperatures above about 450–460° F. (232 to 238° C.) induce decarboxylation of trimellitic acid to the phthalic acids and the ultimate result is a lower rather than a higher trimellitic acid yield. Increasing oxygen concentration aids in oxidative consumption of reaction solvent medium and free radical induced aromatic ring coupling.

The preparation of trimellitic acid by oxidation of pseudocumene in the presence of lower alkanoic acid reaction solvent presents a problem of its own. Trimellitic acid is substantially soluble in the reaction solvent media to make recovery of more than about 65 to 70% of trimellitic acid commercially not feasible by the crystallization thereof from the liquid reaction mixture. Thus the lower the oxidation yield of trimellitic acid the lower still will be the recovery of the desired product from a crystallization technique. Trimellitic acid recovery can be increased by removing a substantial portion or all of the acidic reaction solvent. However, when there are also present large amounts of such byproducts as benzoic acid (two COOH groups lost by decarboxylation); the three phthalic acid isomers; methylphthalic acids, reducible partial oxidation products such as formyl phthalic acids and methylol phthalic acids and the like, there are too many closely related acid impurities in admixture with trimellitic acid to make commercially feasible recovery of it in a suitable pure form. A recovery system wherein the total liquid reaction mixture is distilled, trimellitic acid is dehydrated to its intramolecular anhydride and this anhydride is distilled off and recovered would become a feasible commercial recovery system only provided a high yield of trimellitic acid and lower yield of methylphthalic acids and reducible partial oxidation products would be obtainable.

It has been discovered that the prior oxidation problems which came from the autoinhibitions during pseudocumene oxidation with air in a catalytic liquid phase system was provided in general, by having too active a catalyst system in the beginning and during about ⅔ of the oxidation and a system not sufficiently active in the last of the oxidation. By somewhat precise oxidation rate studies as applied to the oxidation of first methyl group, then applied to the oxidation of the second methyl group and lastly applied to the third methyl groups by control means of a nature generally used only in precise analytical process, it was learned how the catalytic liquid phase oxidation of pseudocumene with air could be conducted and break through the 65 to 75 mole percent yield ceiling theretofore experienced. Such a precise control technique while effective for small scale experimental studies would not be feasible for commercial practices. However, by using certain strongly influencing catalytic directors and applying them to advantage while dropping less controlling precise operating techniques and their advantages, an over-all commercially feasible novel mode of catalytic oxidation feasible for commercial operation was devised. This novel mode of utilizing the liquid phase air oxidations in the presence of the aforementioned systems of catalysts comprises using during about the first 65 to 70% of the oxidation of pseudocumene the combination of the side chain oxidation initiator or promoter with a heavy metal having the oxidation potential of at least equal to that of cerium and/or cobalt. Thereafter, heavy meals having an oxidation potential lower than cerium and/or cobalt, i.e. the oxidation potential of manganese and lower, can be used with advantage. It is noted that in the prior art oxidations of methyl benzenes combinations of cobalt and manganese are said to provide a more efficient system of catalysts than the use of either cobalt or manganese alone. However, in the liquid phase oxidation of pseudocumene with air or other source of molecular oxygen such as commercial oxygen, the initial presence of manganese with cobalt and/or cerium contributes most to the aforementioned autoinhibitions of oxidation during the first 65 to 70% of the oxidation and hence, the previously experienced ceiling of 65 to 75 mole percent of theory yield of trimellitic acid from pseudocumene.

The novel staging of introduction of heavy metal component of oxidation potential equal to or less than that of manganese in the oxidation of pseudocumene and other trimethyl substituted aromatic hydrocarbons with only two methyls on vicinal ring carbons is conducted in the following manner. A mixture of said trimethyl substituted aromatic hydrocarbons, reaction solvent, cobalt and/or cerium or heavy metals of like or higher oxidation potential and the side chain oxidation initiator or promoter (acetaldehyde, methyl ketone or bromine) are provided in an oxidation zone at a temperature of at least the oxidation threshold temperature for the particular trialkyl substituted aromatic hydrocarbon catalyst system and oxygen (oxygen requires a much lower oxidation initiative temperature than does air for example) and the desired source of molecular oxygen is injected into the liquid phase. Temperature and pressure control can be accomplished by the use of an overhead condenser to condense and recycle to the liquid phase in the oxidation zone reaction solvent and unoxidized hydrocarbon. The uncondensed materials are vented through a pressure controlling means. The oxidation temperature can be permitted to increase to that giving the maximum rate of oxidation or can be started at that temperature which ever is the most convenient. Since three methyl groups require 4.5 moles oxygen for their complete conversion to carboxylic acid groups, the addition of heavy metal of lower oxidation potential than cobalt and/or cerium, i.e. manganese, is made after about 3.0 to 3.2 moles of oxygen have been injected. The introduction of molecular oxygen is continued with the presence of the second stage system of catalysis until a total of at least 4.5 moles of oxygen, preferably about 4.7 to 5.0 moles of oxygen, have been injected in a batchwise or in each of a time scheduled combination of batchwise operation (i.e. intermittent batchwise operation) or in semi-continuous oxidation where the hydrocarbon to be oxidized is charged in part initially and the remainder is pumped in simultaneously with oxygen injection.

For continuous operation care must be taken so that there is no back-mixing of first and second stage systems of catalysis. Plug flow type continuous oxidation will suitably prevent said back-mixing of second stage catalysis system with the first stage. Said back-mixing, will, of course, lead to the autoinhibitions for which the novel technique of this invention provides useful means of avoidance.

As hereinbefore stated the novel technique of this invention can be used with the three aforementioned systems of catalysis. However, the two catalysis systems employing acetaldehyde or methyl ketones with heavy metal oxidation catalysts are usually conducted at low temperatures, e.g. 50 to 125° C., and thus the production of desired acid product per unit of time is lower than a higher temperature oxidation conducted in the same size oxidation apparatus. Accordingly, the novel technique of this invention is preferably conducted with the system of catalysis provided by a combination of heavy metal oxidation catalyst and bromine because of its ability to produce higher yields per unit of time.

In the application of the process of this invention to the catalytic liquid phase oxidation of pseudocumene using the preferred system of catalysis it is preferred to employ acetic acid as the reaction solvent in solvent-to-hydrocarbon weight ratio ($S_R$) in the range of 3.0 to 6.0 parts acetic acid per part pseudocumene by weight. The use of acetic acid solvent ratios of 3.0 to 3.5 gives a 20–21 mole percent yield increase over the use of solvent ratios of 1.5 to 2.0 and solvent ratios in the range of 5.0 to 6.0 acetic acid to pseudocumene give yield improvements of 9.5 mole percent over the 3.0 to 3.5 $S_R$ range. Also it is preferred to start the pseudocumene oxidation at 290 to 380° F. and complete the oxidation at 400 to 450° F.

The following illustrates the effect of the autoinhibition when cobalt and manganese are present throughout the oxidation.

In the following comparative oxidations and in the examples illustrating the process of this invention a tubular titanium oxidation reactor (hereinafter referred to as "Ti-Tube Reactor" was used. This apparatus is a titanium tube with top and bottom flanged closures. The upper half of the tube has a jacket through which a coolant can be circulated and thus functions as a vertical reflux condenser. The lower half of the vertical tube is heated by controllable electric heaters. The top flange is adapted for charging liquid components to the reactor through a valved charge line. The bottom flange is adapted for charging air or other source of molecular oxygen and, if desired, also liquids. Exhaust gas leaves the vertical tube between the top flange and the upper jacketed portion of the tube and pass through an adjustable pressure controlling valve which is used to control pressure in the reactor. A slip stream of exhaust gas is passed through recording $O_2$ and $CO_2$ analyzers for monitoring the $O_2$ and $CO_2$ content (by volume) of the exhaust gas stream. Reaction temperature is measured by thermocouples inserted into the lower half i.e. oxidation zone, of the tube through the bottom flange. The liquid phase oxidation mixture product is removed from the Ti-Tubular Reactor, after depressuring and cooling, by removal of the bottom flange and opening the valved charging line in the top flange.

In this Ti-Tube Reactor oxidation reactions can be conducted batchwise by charging all the reaction solvent and methyl substituted aromatic hydrocarbon to be oxidized with a part or all of the catalyst system components. The reaction mixture is heated to the desired temperature for oxidation initiation with the pressure control valve set at the pressure to maintain a liquid phase in the oxidation zone. Air as other source of molecular oxygen under pressure is introduced into the oxidation zone when the mixture in the oxidation zone is at least at oxidation initiation temperature. The batchwise oxidation can be modified by the addition of a portion of the catalyst system components during oxidation but, as long as all the hydrocarbon to be oxidized is added initially, this is still referred to as batchwise oxidation.

In the Ti-Tube Reactor oxidation reactions can be carried out by charging a portion of the solvent and all or a portion of the components of the catalyst system and then heating this solution under pressure to at least the oxidation initiation temperature. Thereafter the methyl substituted aromatic hydrocarbon to be oxidized with or without oxidation solvent solution of one or more catalyst system components and source of molecular oxygen are simultaneously and continuously charged to the oxidation zone. The source of molecular oxygen is introduced alone or with a solution of one or more of the components of the catalyst system until the oxidation is terminated after which oxidation reaction mixture product is removed. Such an operation makes use in part of continuous and simultaneous feed of hydrocarbon to be oxidized and molecular oxygen but also makes use of some batchwise operations with respect to a portion of solvent and catalyst components initially and molecular oxygen introduction for completion. Hence, such an operation is semi-continuous. Truly continuous oxidation is conducted by charging to the oxidation zone simultaneously the hydrocarbon to be oxidized, solvent solution of catalyst system and source of molecular oxygen and at the same time continuously removing from the oxidation zone the portion of the liquid phase reaction mixture product containing solvent, catalyst and aromatic acid product equivalent to the hydrocarbon feed.

In the comparative oxidations and the oxidations illustrating the process of this invention, the reaction product effluent is treated to evaporate and remove all of the solvent and by-product water to obtain, as "total solids," the residue dried to constant weight. The "total solids" residue is analyzed. For the purpose of demonstrating the advantages provided by this invention only dimethyl monobasic acids, methyl dibasic acids and tribasic acids content of the "total solids" need be considered because the amount of dimethyl monobasic acid and monomethyl dibasic acid present represent hydrocarbon feed only partially oxidized to the desired triacid product but are potentially still oxidizable to the triacid product. Those mono and dibasic acid intermediates are indicative of the oxidation inhibition previously discussed. They are also accompanied by other partial oxidation products such as aldehydo-carboxylic acids present in substantial proportions. The presence of aldehydo-carboxylic acid intermediates diminish as the methyl monobasic and dibasic acid content diminish until the aldehydo-carboxylic acid intermediates are the only indicators of incomplete oxidation. However, the aldehydo-carboxylic acid impurities are, in general, not products of the major cause of the previously discussed oxidation inhibition but rather are caused by low oxygen gas mass transfer in the liquid phase reaction medium and/or by failure of oxygen contact with the aldehydo-carboxylic acid because it is no longer in solution in the reaction medium.

The catalytic liquid phase air oxidation of pseudocumene (1,2,4-trimethylbenzene) to trimellitic acid in acetic acid solvent will be used to demonstrate the oxidation inhibition and the manner in which the process of this invention overcomes that inhibition. Batchwise air oxidations of pseudocumene conducted in the presence of acetic acid solutions containing 0.1 to 0.4 weight percent bromine and 0.2 to 0.4 total weight percent heavy metals such as combinations of cobalt and manganese, cobalt and cerium, manganese and cerium, with staged pressure and temperature operation over the range of 165 to 400 p.s.i.g. and temperatures from 370 to 420° F. in 90 to 180 minutes produced trimellitic acid yields in the 70 to 80 mole percent range with aldehydo-acids content in the range of 0.4 to 1.0 weight percent range, dimethyl benzoic acids in the 4 to 1 weight percent range and methyl phthalic acids in 4 to 0.5 weight percent range but also with 9 to 15 weight percent of trifunctional oxidative coupled products.

The first attempts to use the semi-continuous oxidation of pseudocumene by charging air and pseudocumene into the oxidation zone containing acetic acid solution of 0.3 weight percent bromine and 0.4 total weight percent heavy metals at 390 to 420° F. and 350 to 400 p.s.i.g. it was noted that the oxygen reaction rate dropped sharply 10 to 20 minutes after introduction of pseudocumene, i.e. 0.2 to 0.4 of pseudocumene charged. The oxygen reaction rate remained low throughout the oxidation. Increasing reaction temperature and pressure had no effect on the oxygen reaction rate. These low oxygen reaction rates were in the range of 0.1 to 0.3 moles per minute per gallon $\times 10^3$ of liquid phase in the oxidation zone in 90 to 120 minutes of total reaction. The oxidation inhibition (exemplified by low oxygen reaction rate), if caused by catalyst inactivation might likely be overcome by the addition of fresh catalyst during or after charging of pseudocumene. Comparative Oxidations I, II, and III illustrate these types of catalyst additions where the total catalyst concentration on acetic acid solvent are all 0.26 percent bromine and 0.19 percent total of cobalt and manganese on a weight basis. In Comparative Oxidation I 87% of the catalyst and solvent are initially charged. In Comparative Oxidation II 75% of the catalyst and solvent are initially charged, and in Comparative Oxidation III 25% of the catalyst and solvent are initially charged. Thereafter pseudocumene and air are introduced. In Comparative Oxidations I and II the remainder of the catalyst and solvent and catalyst are charged after the pseudocumene has been charged. In Comparative Oxidation III the remainder of catalyst and solvent (75% of each) are charged with pseudocumene. Other conditions specific to these oxidations are shown in Table I. In this table "PSC" is used to designate pseudocumene, "MPA" is used to designate methyl phthalic acids and "TMLA" is used to designate trimellitic acid.

TABLE I.—COMPARATIVE OXIDATIONS

|  | I | II | III |
|---|---|---|---|
| Continuous Period: |  |  |  |
| Temperature, °F | 363 | 356 | 425 |
| Pressure, p.s.i.g. (Start-End) | 170–190 | 170–400 | 350 |
| PSC addition, lb./min | 0.48 | 0.44 | 0.60 |
| Average air rate, cubic feet/lb. PSC/minute | 53.1 | 45.5 | 61.7 |
| Average O₂ exhaust gas, volume percent | 8.8 | 11.7 | 5.7 |
| Average CO₂ exhaust gas, volume percent | 1.1 | 0.9 | 3.6 |
| Oxygen reaction rate range (Start-End)[1] | .67 to .17 | .46 to .04 | .68 to .47 |
| Net oxygen reacted, moles/mole PSC | 2.61 | 1.41 | 2.26 |
| Batch Period: |  |  |  |
| Temperature, °F | 353 | 386 | 430 |
| Pressure, p.s.i.g. (Start-End) | 190–300 | 400 | 350–370 |
| Catalyst addition, minutes | 68 | 73 | ([2]) |
| Average air rate, cubic feet/lb. PSC/min.[3] | 25 | 57 | 61.7 |
| Average O₂ exhaust gas, volume percent | 14.7 | 8.9 | 8.0 |
| Average CO₂ exhaust gas, volume percent | 1.4 | 2.8 | 4.0 |
| Oxygen reaction rate range [1] | .17 to .02 | .04 to .02 | .47 to .12 |
| Net oxygen reacted, moles/mole PSC | 3.30 | 4.63 | 4.10 |
| Total reaction time, minutes | 95 | 165 | 110 |
| Terminal O₂ exhaust gas, volume percent | 18.0 | 18.4 | 17.7 |
| TMLA yield, mole percent | 38.2 | 61.8 | 79.1 |
| Total Solids: |  |  |  |
| MPA, weight percent | 19.8 | 16.7 | 1.74 |
| TMLA, weight percent | 42.8 | 59.8 | 85.1 |

[1] Moles per minute per gallon ×10³.
[2] Catalyst added during continuous period.
[3] Related to rate of PSC addition for continuous period.

In Comparative Oxidation II about minute 70 the oxygen reaction rate increased to 0.62 and gradually decreased to 0.14 at minute 95. Thus, for about 25 minutes a reasonably high reaction rate was obtained about 20 to 45 minutes after start of addition of fresh catalyst.

The results of Comparative Oxidation III are about comparable with the best completely batch oxidations of pseudocumene with air. However, the mole percent conversion of pseudocumene to trimellitic acid is still too low.

The following examples will illustrate the improved yield and quality of trimellitic acid from catalytic liquid phase air oxidation of pseudocumene using acetic acid solvent by the practices of this invention. For convenience, the practice of this invention consists of carrying out the oxidation first in the presence of the combination of side chain oxidation initiator or promoter and heavy metal oxidation catalyst of oxidation potential equal to or above that of cobalt and/or cerium until 65 to 70% of the theoretical oxygen has been reacted (65 to 70% of the methyl groups oxidized to carboxylic acid groups) and then adding heavy metal oxidation catalyst of oxidation potential equal to or lower than that of manganese.

EXAMPLE 1

A batch oxidation of pseudocumene in acetic acid is conducted by charging all the pseudocumene and a portion (about 85%) of the acetic acid with dissolved cobalt and cerium acetates to provide a total concentration of these metals of 0.083 weight percent and 0.21 weight percent bromine on total acetic acid used. The reaction mixture is heated to 290° F. and pressure to maintain a liquid phase in the oxidation. Pressurized air is injected into the oxidation zone after about three net moles of oxygen had reacted (about 30 minutes), the remaining 15% of acetic acid is added with sufficient dissolved manganese acetate to provide manganese in 0.011 weight percent on total acetic acid used. The reaction temperature is increased to 455° F. and the reaction is continued for an additional 30 minutes. The total solids contained 0.65 weight percent methyl phthalic acids, 0.13 weight percent aldehydocarboxylic acids and 84.9 weight percent trimellitic acid. The conversion of pseudocumene to trimellitic acid is 92.0 mole percent.

EXAMPLES 2 AND 3

Two batchwise oxidations of pseudocumene (PSC) are conducted as in Example 1 but the reaction conditions are as shown in Table II. All the pseudocumene is charged with 87% of the acetic acid containing 0.07 weight percent cobalt and 0.05 weight percent bromine. Oxidation is started and additional acetic acid containing dissolved manganese as its acetate, is added when the net oxygen reacted is about 2 to 2.5 moles per mole pseudocumene. That is at about minute 30 in Example 2 and minute 25 in Example 3. The final catalyst concentration based on total acetic acid used is 0.06 weight percent bromine and 0.47 total weight percent cobalt and manganese.

TABLE II

|  | Example 2 | | | | Example 3 | | | |
|---|---|---|---|---|---|---|---|---|
|  | Time, Minute | | | | Time, Minute | | | |
|  | 0–15 | 15–30 | 30–54 | 54–65 | 0–15 | 15–25 | 25–50 | 50–63 |
| Reaction condition during oxidation at time period indicated: |  |  |  |  |  |  |  |  |
| Temperature, °F | 375 | 386 | 398 | 389 | 373 | 386 | 405 | 407 |
| Pressure, p.s.i.g. | 159 | 198 | 298 | 425 | 160 | 213 | 271 | 400 |
| Air space velocity, s.c.f.h. per lb. PSC | 86.3 | 96.0 | 86.8 | 24.8 | 83.5 | 95.3 | 980 | 27.3 |
| Exhaust gas O₂, volume percent (end) | 2.4 | 4.5 | 16.9 | 18.2 | 2.1 | 4.9 | 9.6 | 17.2 |
| Net O₂ reacted, moles per mole PSC | 1.36 | 2.57 | 4.22 | 4.22 | 1.28 | 2.01 | 4.06 | 4.13 |
| Net O₂ reaction rate, moles per min. per gal | 1.1 | 0.9 | 0.7 | 0.02 | 1.0 | 0.8 | 0.9 | 0.03 |
| Product in total solids based on pseudocumene charged, mole percent: |  |  |  |  |  |  |  |  |
| Monomethyl phthalic acids |  | 0.06 | | | | 0.06 | | |
| Trimellitic acid yield |  | 90.1 | | | | 90.8 | | |
| Aldehydo-carboxylic acids |  | 0.02 | | | | 0.02 | | |

EXAMPLES 4 AND 5

Two semi-continuous oxidations of pseudocumene (PSC) are conducted in the general manner previously described. In Example 4, 86% of the solvent acetic acid having catalyst component concentrations later shown is heated to reaction temperature and pressure indicated and then pseudocumene and air are charged. In Example 5, 70% of acetic acid solvent having catalyst components concentration later shown is heated to reaction temperature and pressure indicated and then air, pseudocumene and 7.5% of the acetic acid with catalyst components indicated as increasing are charged. In both examples, after all the pseudocumene is added an acetic acid containing manganese acetate is charged. In Example 5 cobalt and bromine are also charged with manganese. Details of these semi-continuous oxidations otherwise conducted in the Ti-Tube Reactors, as before described, are shown in Table III. In Examples 4 and 5, PSC addition is from minute 0 to minute 35.

TABLE III

| Reaction condition during oxidation at time period indicated: | Example 4 | | | | Example 5 | | |
|---|---|---|---|---|---|---|---|
| | Time, Minute | | | | Time, Minute | | |
| | 0-16 | 16-35 | 35-59 | 59-75 | 0-15 | 15-35 | 35-67 |
| Temperature, °F | 368 | 404 | 426 | 404 | 425 | 425 | 416 |
| Pressure, p.s.i.g | 154 | 262 | 328 | 405 | 314 | 314 | 314 |
| Acetic acid, percent of total | 80 | 80 | 100 | 100 | 70 | 77.5 | 100 |
| Cobalt, weight percent | 0.07 | 0.07 | 0.09 | 0.09 | 0.04 | 0.047 | 0.08 |
| Bromine, weight percent | 0.50 | 0.50 | 0.69 | 0.69 | 0.25 | 0.46 | 0.70 |
| Manganese, weigth percent | 0 | 0 | 0.04 | 0.04 | 0 | 0 | 0.04 |
| Air space velocity, s.c.f.h. per lb. PSC | 51.9 | 83.1 | 99.0 | 38.8 | 50.8 | 50.8 | 50.8 |
| Exhaust gas $O_2$, volume percent (end) | 0.7 | 3.9 | 1.8 | 19.2 | 4.6 | 4.6 | 19.0 |
| Net $O_2$ reacted, moles per mole PSC | 0.92 | 2.21 | 4.08 | 4.30 | 1.2 | 2.4 | 4.33 |
| Net $O_2$ reaction rate, mole/min./gal | 0.8 | 0.8 | 0.9 | 0.2 | 0.5 | 0.5 | 0.5 |

| | Weight percent | Mole percent | Weight percent | Mole percent |
|---|---|---|---|---|
| Total solids components: | | | | |
| Monomethyl phthalic acids | 0.36 | 0.4 | 0.06 | 0.06 |
| Aldehydro-carboxylic acids | 0.19 | 0.2 | <0.02 | <0.02 |
| Trimellitic acid yield | | 91.8 | | 89.1 |

The effect of having manganese and bromine initially present during oxidation of pseudocumene (no cobalt) by semi-continuous operation can be illustrated by the following comparative oxidation. The Ti-Tube Reactor is charged with 71% of the total acetic acid having 0.25 weight percent bromine and 0.04 weight percent manganese. This solution is heated to 429° F. and 323 p.s.i.g. Thereafter pseudocumene (PSC) is pumped in for 33 minutes as air is injected at 77.9 standard cubic feet per pound PSC. During latter period of PSC addition about 14% of total acetic acid with dissolved bromine and cobalt is added, after PSC addition 15% total acetic acid with only dissolved bromine and cobalt is added. Total reaction time is 56 minutes. The net $O_2$ reacted by end of minute 15 is 2.44, end of minute 33 is 3.17 and by end of minute 56 is 4.56 moles per mole PSC. The net oxygen reaction rate is 0.5 mole per minute per gallon $\times 10^3$. The aldehydro-carboxylic acid yield is 0.5 mole percent, but the monomethyl phthalic acids yield is 3.6 mole percent (3.43 weight percent of total solids). The trimellitic acid yield is only 78 mole percent.

What is claimed is:

1. In the process of preparing an aromatic tricarboxylic acid by oxidizing a trimethyl substituted aromatic hydrocarbon having only two methyl groups on vicinal aromatic ring carbon atoms with air in the presence of a catalyst system provided by heavy metal oxidation catalyst and a side chain oxidation initiator or promoter and in the presence of acetic acid in an oxidation zone under liquid phase conditions; the process improvements which comprise conducting the oxidation throughout at a temperature selected from the temperature range of 290° to 450° F. but oxidizing said trimethyl aromatic hydrocarbon first in the presence of only said side chain initiator or promoter and cobalt, cerium or mixtures thereof until about from 2 to 2.5 net moles of oxygen per mole of said trimethyl aromatic hydrocarbon have been consumed and thereafter adding to the oxidation zone a heavy metal oxidation catalyst having the oxidation potential no greater than manganese until the net oxygen consumed is about the stoichiometric mole ratio based on the trimethyl aromatic hydrocarbon.

2. The process of claim 1 where the side chain oxidation initiator or promoter is bromine.

3. The process of claim 2 wherein the heavy metal first used is selected from cobalt, cerium and a mixture of cobalt and cerium and the heavy metal added after a net oxygen consumption of about 2.0 to 2.5 net moles is manganese.

4. The process of claim 3 wherein pseudocumene is oxidized to trimellitic acid first in the presence of the catalyst system provided by cobalt, cerium and bromine.

References Cited

UNITED STATES PATENTS 3,089,906   5/1963   Saffer et al. _____ 260—524

LORRAINE A. WEINBERGER, Primary Examiner

R. WEISSBERG, Assistant Examiner